United States Patent
Oyobe et al.

(10) Patent No.: US 7,550,861 B2
(45) Date of Patent: Jun. 23, 2009

(54) AC POWER SUPPLYING SYSTEM, POWER SUPPLY APPARATUS, AND VEHICLE HAVING THE SAME

(75) Inventors: Hichirosai Oyobe, Toyota (JP); Tetsuhiro Ishikawa, Nishikamo-gun (JP); Yukihiro Minezawa, Anjo (JP); Hitoshi Sato, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 247 days.

(21) Appl. No.: 11/663,214

(22) PCT Filed: Nov. 29, 2005

(86) PCT No.: PCT/JP2005/022265

§ 371 (c)(1),
(2), (4) Date: Mar. 20, 2007

(87) PCT Pub. No.: WO2006/059762

PCT Pub. Date: Jun. 8, 2006

(65) Prior Publication Data

US 2008/0169651 A1  Jul. 17, 2008

(30) Foreign Application Priority Data

Nov. 30, 2004  (JP) ............................. 2004-346979

(51) Int. Cl.
*H02P 9/04* (2006.01)
(52) U.S. Cl. .................. 290/40 C; 290/40 R; 322/37; 123/1 A
(58) Field of Classification Search ................ 290/1 R, 290/40 R, 40 C, 51; 322/37; 123/1 A, 198 DC
See application file for complete search history.

(56) References Cited

U.S. PATENT DOCUMENTS

| 4,407,132 | A | * | 10/1983 | Kawakatsu et al. ........... 60/716 |
| 4,967,096 | A | * | 10/1990 | Diemer et al. ................ 307/19 |
| 6,066,928 | A | | 5/2000 | Kinoshita et al. |
| 6,068,672 | A | * | 5/2000 | Watson et al. ................ 44/629 |
| 6,107,691 | A | * | 8/2000 | Gore et al. ................... 290/1 R |
| 6,118,186 | A | * | 9/2000 | Scott et al. ................ 290/40 B |
| 6,476,571 | B1 | | 11/2002 | Sasaki |

(Continued)

FOREIGN PATENT DOCUMENTS

EP  0 834 977 A2  4/1998

(Continued)

*Primary Examiner*—Nicholas Ponomarenko
(74) *Attorney, Agent, or Firm*—Oliff & Berridge PLC

(57) ABSTRACT

Upon power failure of a commercial power source, an automatic switching device switches to power supply from a hybrid vehicle. An ECU of the vehicle, when receiving a request for generation of a commercial AC voltage, sets an upper-limit power generation amount based on a remaining amount of fuel. The ECU transmits the upper-limit power generation amount via an antenna to an on-premises ECU, while controlling a power generation amount based on the upper-limit power generation amount. The on-premises, when receiving the upper-limit power generation amount, controls the load state such that commercial AC power is supplied firstly to a first load of priority level 1, according to proprieties registered in advance, and such that the amount of the power supplied to the electric loads does not exceed the upper-limit power generation amount.

16 Claims, 8 Drawing Sheets

U.S. PATENT DOCUMENTS

| | | |
|---|---|---|
| 6,836,416 B2 | 12/2004 | Ishihara et al. |
| 7,213,580 B1 * | 5/2007 | Beyer et al. .................. 123/509 |
| 7,256,507 B2 * | 8/2007 | Endou et al. ............... 290/40 A |
| 7,265,455 B2 * | 9/2007 | Oyobe et al. ................. 290/1 R |
| 7,301,247 B2 * | 11/2007 | Kishibata et al. ............... 307/44 |
| 2007/0289794 A1 | 12/2007 | Ishikawa et al. |

FOREIGN PATENT DOCUMENTS

| | | |
|---|---|---|
| JP | A 63-253897 | 10/1988 |
| JP | A 02-142329 | 5/1990 |
| JP | A 04-295202 | 10/1992 |
| JP | 08-047110 | 2/1996 |
| JP | 08-126121 | 5/1996 |
| JP | 11-178114 | 7/1999 |
| JP | A 11-178241 | 7/1999 |
| JP | A 2000-184591 | 6/2000 |
| JP | A 2000-303874 | 10/2000 |
| JP | 2000-324857 | 11/2000 |
| JP | A 2001-008380 | 1/2001 |
| JP | 2001-224133 | 8/2001 |
| JP | 2001-231103 | 8/2001 |
| JP | A 2001-258177 | 9/2001 |
| JP | 2002-359978 | 12/2002 |
| JP | 2006-158084 | 6/2006 |
| JP | 2006-158121 | 6/2006 |
| JP | 2006-158124 | 6/2006 |
| JP | 2006-345621 | 12/2006 |
| WO | WO 2006/059763 A1 | 6/2006 |

* cited by examiner

AC POWER SUPPLYING SYSTEM, POWER SUPPLY APPARATUS, AND VEHICLE HAVING THE SAME

TECHNICAL FIELD

The present invention relates to an alternating current (AC) power supplying system, a power supply apparatus, and a vehicle having the same. More particularly, the present invention relates to an AC power supplying system that generates and supplies AC power to an external electric load, a power supply apparatus, and a vehicle having the same.

BACKGROUND ART

Conventionally, it is proposed to utilize a hybrid vehicle or an electric vehicle having a motor generator as a motive power source as a commercial power source (for example, see Japanese Patent Laying-Open Nos. 2001-258177, 2001-008380, and 04-295202). The idea is to utilize a hybrid vehicle or the like as an emergency power source in an emergency or disaster, or as a commercial power source at a camp site or the like where there is no commercial power supply equipment around.

For example, Japanese Patent Laying-Open No. 2001-258177 discloses an AC power supplying system that supplies power from a battery mounted on an electric vehicle to a domestic power supply in a house. Specifically, with provision of a charger/discharger connected to a power line on the house side and a controller controlling charge/discharge by monitoring the state of the battery mounted on an electric vehicle, it is possible to realize both of power supply from the household power supply to the electric vehicle and power supply from the electric vehicle to the household power supply. Further, when supplying power from the electric vehicle to the house side, an amount of power required for the electric vehicle to run within a normal traveling range is secured to allow for urgent outing.

With a conventional AC power supplying system, however, the following problems would occur when AC power is supplied to an external electric load from a vehicle instead of a commercial power source.

In a conventional system, when the commercial power source is normal and is capable of supplying power to an electric load, approximately constant AC power with high output level is supplied to the electric load. When power is supplied from the commercial power source to a plurality of electric loads placed in a house, the power supply is shut off by a breaker when the load amount of the electric loads exceeds the level permitted to the consumer of electricity under contract.

Upon power failure of the commercial power source, hindering power supply therefrom, power supply is switched to the vehicle as an emergency power source. At this time, the AC power output from the vehicle varies depending on the state of the power supply apparatus generating the AC power and the like. As such, it is difficult to supply power to the electric loads as stably as in the case of using the commercial power source.

For example, assume that the AC power output from the vehicle is less than the AC power output from the commercial power source. In this case, on the house side, while the load amount of the electric loads before and after the power failure is constant, the supply amount of the AC power decreases. At this time, if power is being supplied from the commercial power source, the breaker will shut off the power supply, as described above, because the load amount exceeds the supply amount of the AC power. In contrast, in the case of supplying power from the vehicle, the breaker will not shut off the power supply, and thus, the AC voltage output from the power supply apparatus will suffer considerable voltage drop.

Taking into consideration such drop of the AC voltage, in the conventional system, the electric loads to be used by the consumer of electricity would be restricted in advance, before switching the power source from the commercial power source to the power supply apparatus of the vehicle. This means that in an emergency like power failure of the commercial power source, the power source cannot be switched automatically.

The present invention has been made to solve the above-described problems, and an object of the present invention is to provide an AC power supplying system capable of restricting drop of an AC voltage output from a power supply apparatus, a power supply apparatus, and a vehicle having the same.

DISCLOSURE OF THE INVENTION

According to the present invention, an AC power supplying system supplying AC power to a plurality of electric loads includes: a power supply apparatus outputting the AC power; and a control device controlling a load amount of each of the plurality of electric loads such that a supply amount of the AC power to the plurality of electric loads does not exceed an upper limit of a power amount which can be output from the power supply apparatus.

Preferably, the control device includes: a receiving unit receiving a signal designating the upper limit of the power amount from the power supply apparatus; a load state detection unit detecting the load amount of each of the plurality of electric loads; and a load state control unit supplying the AC power only to a selected electric load from among the plurality of electric loads such that a sum of the detected load amounts of the electric loads does not exceed the upper limit of the power amount designated by the received signal.

Preferably, the load state control unit selects the electric load to be supplied with the AC power, in accordance with priorities registered in advance.

Preferably, the priorities are determined based on relative evaluation of importance of each of the plurality of electric loads.

Preferably, the AC power supplying system further includes: a commercial power source; and a switching device for automatically connecting one of the commercial power source and the power supply apparatus to the plurality of electric loads.

Preferably, the load state control unit compares a supply amount of the AC power from the commercial power source with the upper limit of the power amount at a timing when the switching device switches from connection between the power supply apparatus and the plurality of electric loads to connection between the commercial power source and the plurality of electric loads, and when the supply amount from the commercial power source is smaller than the upper limit of the power amount, supplies the AC power only to a selected electric load from among the plurality of electric loads such that a sum of the load amounts of the plurality of electric loads does not exceed the supply amount from the commercial power source.

Preferably, the power supply apparatus includes: a power source; a power converter converting a DC power from the power source to the AC power and outputting the AC power; an upper limit setting unit setting an upper limit of the power amount based on a remaining capacity of the power source; a power amount control unit controlling a power amount to be output, based on the set upper limit of the power amount; and a transmitting unit transmitting a signal designating the upper limit of the power amount to the control device.

Preferably, the upper limit setting unit sets the upper limit of the power amount such that the remaining capacity of the power source is not less than a prescribed threshold value.

Preferably, the prescribed threshold value corresponds to a remaining capacity of the power source required for the power supply apparatus to resupply the DC power to the power source.

Preferably, the power supply apparatus includes: a first motor generator coupled to an internal combustion engine of a vehicle and generating power; a second motor generator coupled to a driving wheel of the vehicle; first and second inverters connected to the first and second motor generators and receiving supply of DC power from the power source; and a control unit controlling operations of the first and second inverters to drive the first and second motor generators and to generate AC power between neutral points of the first and second motor generators. The control unit includes an upper limit setting unit setting an upper limit of a power amount generated by the first motor generator based on a remaining amount of fuel in the internal combustion engine, a power generation amount control unit controlling the power amount generated, based on the set upper limit of the power amount, and a transmitting unit transmitting a signal designating the upper limit of the power amount to the control device.

Preferably, the upper limit setting unit sets the upper limit of the generated power amount such that the remaining amount of the fuel in the internal combustion engine is not less than a prescribed threshold value.

Preferably, the prescribed threshold value corresponds to a remaining amount of the fuel in the internal combustion engine required for the vehicle to run to a supply station of the fuel.

Preferably, the transmitting unit and the receiving unit have wireless communication media.

Preferably, the transmitting unit and the receiving unit have power lines for supplying the AC power from the power supply apparatus to the plurality of electric loads as communication media.

According to another aspect of the present invention, a power supply apparatus supplying generated AC power to an external electric load includes: a first motor generator coupled to an internal combustion engine of a vehicle and generating power; a second motor generator coupled to a driving wheel of the vehicle; first and second inverters connected to the first and second motor generators and receiving supply of DC power from a power source; and a control device controlling operations of the first and second inverters to drive the first and second motor generators and to generate the AC power between neutral points of the first and second motor generators. The control device includes an upper limit setting unit setting an upper limit of a power generation amount of the first motor generator based on a remaining amount of fuel in the internal combustion engine, a power generation amount control unit controlling the power generation amount based on the set upper limit of the power generation amount, and a transmitting unit transmitting a signal designating the upper limit of the power generation amount to the external electric load.

Preferably, the upper limit setting unit sets the upper limit of the power generation amount such that the remaining amount of the fuel in the internal combustion engine is not less than a prescribed threshold value.

Preferably, the prescribed threshold value corresponds to a remaining amount of the fuel in the internal combustion engine required for the vehicle to run to a supply station of the fuel.

A vehicle according to the present invention is provided with the power supply apparatus according to the other aspect of the present invention.

According to the present invention, in a configuration where AC power is supplied from a power supply apparatus mounted on a vehicle to an electric load, the load amount of the electric load is controlled such that the supply amount of the AC power from the power supply apparatus does not exceed an upper limit of the power generation amount of the power supply apparatus, to prevent voltage drop that would otherwise occur when switching the power source from the commercial power source to the power supply apparatus. Accordingly, it is possible to automatically switch the power source upon power failure of the commercial power source.

Further, upon recovery of the commercial power source as well, the load state is controlled so as not to exceed the power generation amount of the commercial power source, so that it is possible to automatically switch the power source from the power supply apparatus to the commercial power source.

Still further, the load state is controlled such that the commercial AC power is supplied to the one having higher priority. This can reduce the influence exerted on the user.

BEST MODES FOR CARRYING OUT THE INVENTION

Figure 1:
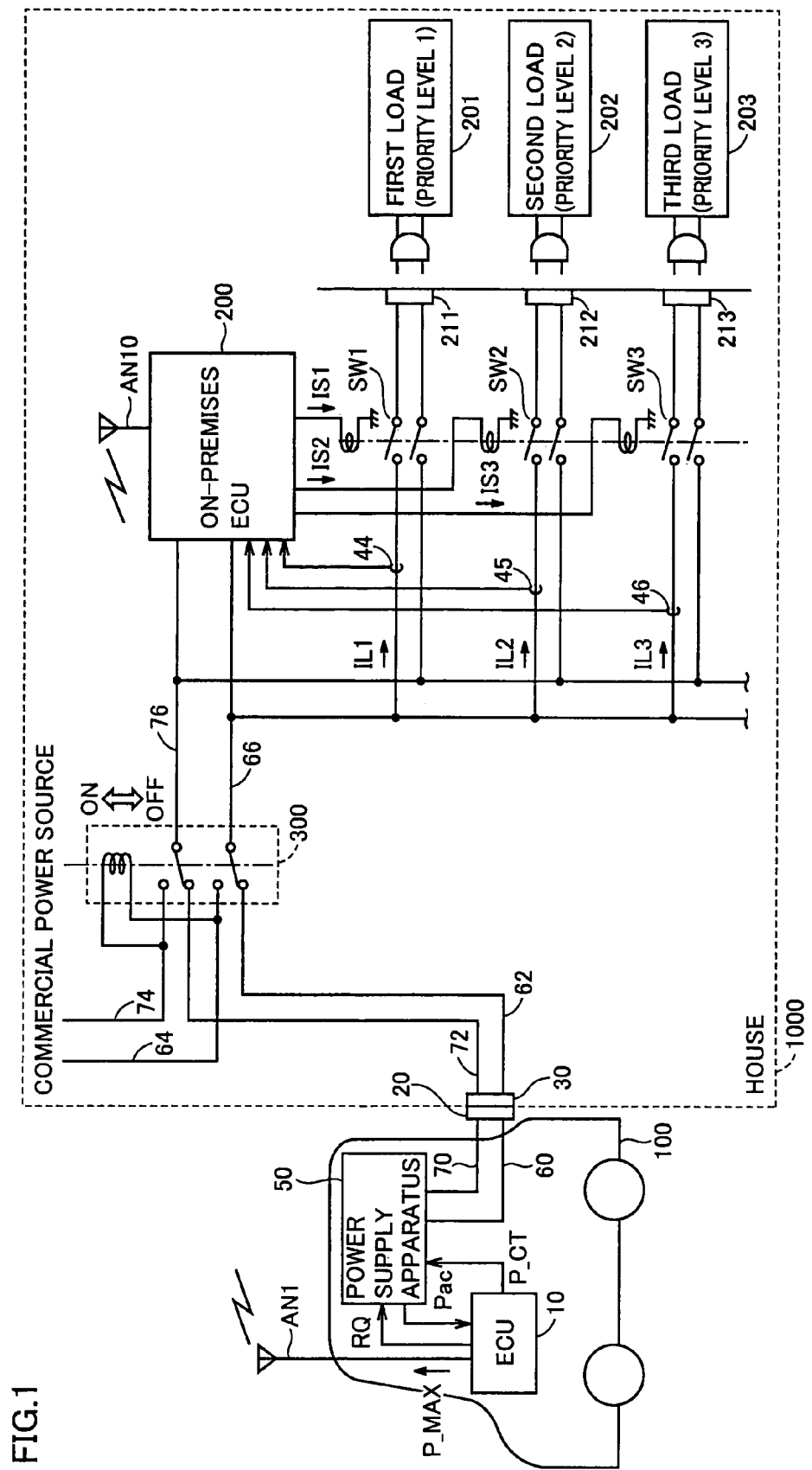
FIG. 1 is a schematic block diagram illustrating an AC power supplying system according to a first embodiment of the present invention.

Hereinafter, embodiments of the present invention will be described in detail with reference to the drawings. In the drawings, the same reference characters denote the same or corresponding portions.

First Embodiment

FIG. 1 is a schematic block diagram illustrating an AC power supplying system according to the first embodiment of the present invention.

Referring to FIG. 1, the AC power supplying system includes a commercial power source and a power supply apparatus 50 as power sources for a plurality of electric loads (first through third loads 201-203) provided in a house 1000. The commercial power source and power supply apparatus 50 are selectively coupled to first through third loads 201-203 and to an on-premises electrical control unit (ECU) 200 by an automatic switching device 300 provide in house 1000, to supply commercial AC power to first through third loads 201-203 as well as to on-premises ECU 200, as will be described later.

Power supply apparatus 50 is mounted on a vehicle 100. Vehicle 100 includes power supply apparatus 50, an ECU 10, an antenna AN1, a connector 20 for output of commercial AC power, and AC output lines 60, 70.

Figure 2:
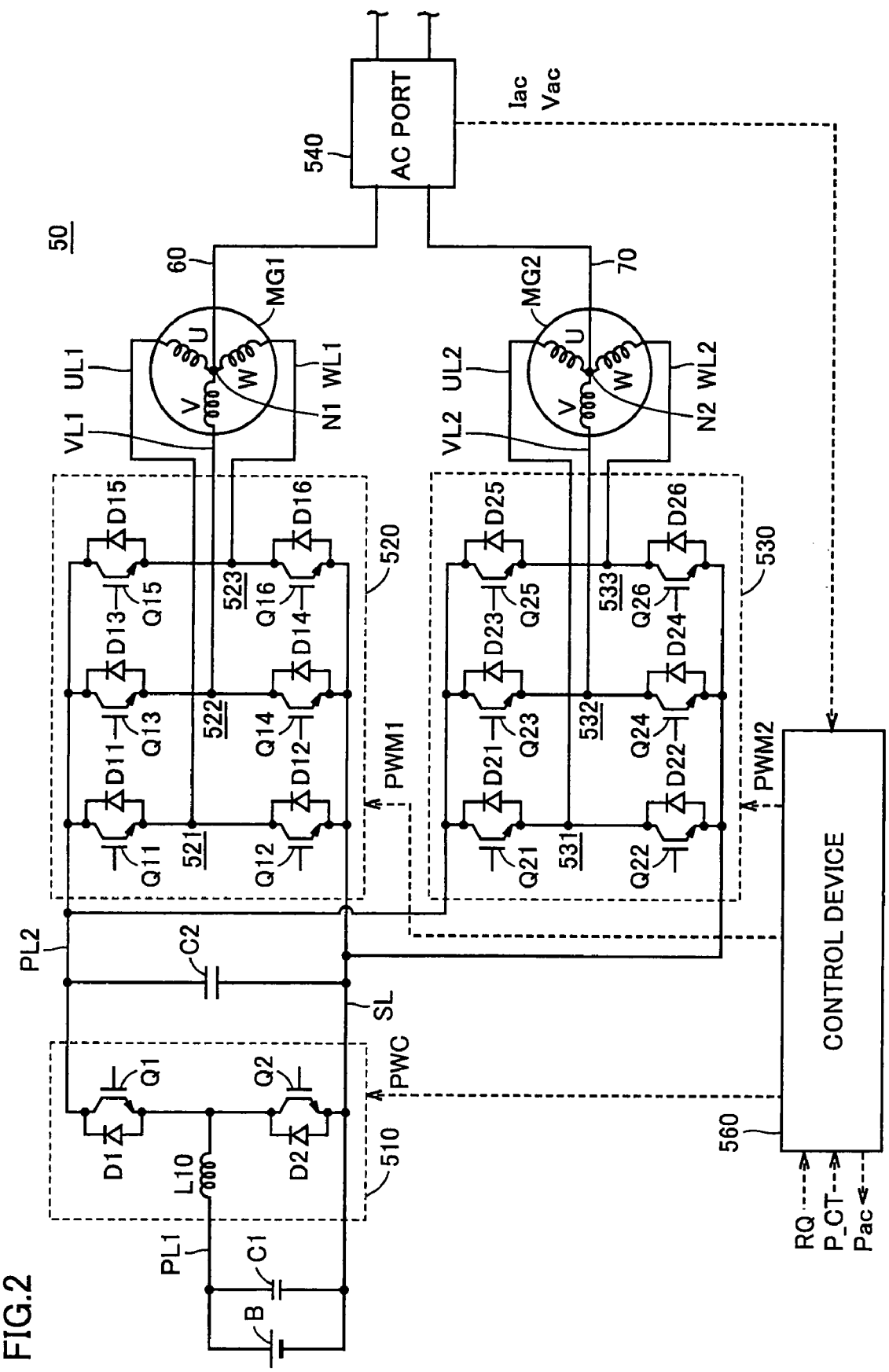
FIG. 2 is a schematic block diagram of a power supply apparatus in FIG. 1.

FIG. 2 is a schematic block diagram of power supply apparatus 50 in FIG. 1.

Referring to FIG. 2, power supply apparatus 50 includes a battery B, a boost converter 510, inverters 520, 530, motor generators MG1, MG2, a control device 560, capacitors C1, C2, power supply lines PL1, PL2, a ground line SL, U-phase lines UL1, UL2, V-phase lines VL1, VL2, and W-phase lines WL1, WL2.

Power supply apparatus 50 is mounted, e.g., on a hybrid vehicle as vehicle 100. Motor generator MG1 is incorporated into the hybrid vehicle so as to operate as an electric generator that is driven by an engine and also as an electric motor that can start the engine. Motor generator MG2 is incorporated into the hybrid vehicle as an electric motor that drives driving wheels of the hybrid vehicle.

Motor generators MG1, MG2 are each made of, e.g., a three-phase AC synchronous motor. Motor generator MG1 generates an AC voltage using turning force from the engine, and outputs the generated AC voltage to inverter 520. Motor generator MG1 also generates driving force by the AC voltage received from inverter 520 to start the engine. Motor generator MG2 generates driving torque of the vehicle by the AC voltage received from inverter 530. Motor generator MG2 also generates an AC voltage in a regenerative braking state, and outputs the same to inverter 530.

Battery B, which is a direct current (DC) power source, is made of, e.g., a secondary battery such as nickel-hydrogen battery, lithium-ion battery or the like. Battery B outputs the generated DC voltage to boost converter 510, and is charged with the DC voltage output from boost converter 510.

Boost converter 10 includes a reactor L10, npn-type transistors Q1, Q2, and diodes D1, D2. Reactor L10 has one end connected to power supply line PL1, and another end connected to a connection point between npn-type transistors Q1, Q2. The npn-type transistors Q1, Q2 are connected in series between power supply line PL2 and ground line SL, and receive a control signal PWC from control device 560 at their bases. Diodes D1, D2 are connected between the collector and emitter of npn-type transistors Q1, Q2, respectively, to cause a current to flow from the emitter side to the collector side.

Inverter 520 includes a U-phase arm 521, a V-phase arm 522, and a W-phase arm 523. U-phase arm 521, V-phase arm 522 and W-phase arm 523 are connected in parallel between power supply line PL2 and ground line SL. U-phase arm 521 is formed of npn-type transistors Q11, Q12 connected in series, V-phase arm 522 is formed of npn-type transistors Q13, Q14 connected in series, and W-phase arm 523 is formed of npn-type transistors Q15, Q16 connected in series. Further, diodes D11-D16 are connected between the collector and emitter of npn-type transistors Q11-Q16, respectively, to cause a current to flow from the emitter side to the collector side.

A connection point between the npn-type transistors of each phase arm is connected via corresponding one of U, V, W-phase lines UL1, VL1, WL1 to an end of a corresponding phase coil, opposite from the neutral point, of motor generator MG1.

Inverter 530 includes a U-phase arm 531, a V-phase arm 532, and a W-phase arm 533. U-phase arm 531, V-phase arm 532 and W-phase arm 533 are connected in parallel between power supply line PL2 and ground line SL. U-phase arm 531 is formed of npn-type transistors Q21, Q22 connected in series, V-phase arm 532 is formed of npn-type transistors Q23, Q24 connected in series, and W-phase arm 533 is formed of npn-type transistors Q25, Q26 connected in series. Further, diodes D21-D26 are connected between the collector and emitter of npn-type transistors Q21-Q26, respectively, to cause a current to flow from the emitter side to the collector side.

In inverter 530 as well, the connection point of the npn-type transistors of each phase arm is connected via corresponding one of U, V, W-phase lines UL2, VL2, WL2, to an end of a corresponding phase coil, opposite from the neutral point, of motor generator MG2.

Capacitor C1 is connected between power supply line PL1 and ground line SL, and reduces an influence of voltage variation on battery B and boost converter 510. Capacitor C2 is connected between power supply line PL2 and ground line SL, and reduces an influence of voltage variation on inverters 520, 530 and boost converter 510.

Boost converter 510, based on control signal PWC from control device 560, boosts a DC voltage from battery B by storing the current flowing in response to the switching operation of npn-type transistor Q2 as magnetic field energy in reactor L10. It then outputs the boosted voltage via diode D1 to power supply line PL2 in synchronization with the timing when npn-type transistor Q2 is turned off. Further, boost converter 510, based on control signal PWC from control device 560, lowers the level of the DC voltage received from inverter 520 and/or inverter 530 via power supply line PL2 to the voltage level of battery B, for charging battery B.

Inverter 520 converts the voltage Vdc received from power supply line PL2 (corresponding to the terminal-to-terminal voltage of capacitor C2) to an AC voltage and outputs the same to motor generator MG1, based on a control signal PWM1 from control device 560. This drives motor generator MG1 to generate desired torque. Further, inverter 520 converts the AC voltage generated by motor generator MG1 to a DC voltage, and outputs the converted DC voltage to power supply line PL2, based on control signal PWM1 from control device 560.

Inverter 530 converts the voltage Vdc received from power supply line PL2 to an AC voltage and outputs the same to motor generator MG2, based on a control signal PWM2 from control device 560. This drives motor generator MG2 to generate desired torque. Further, at the time of regenerative braking of motor generator MG2, inverter 530 converts the AC voltage output from motor generator MG2 to a DC voltage, and outputs the converted DC voltage to power supply line PL2, based on control signal PWM2 from control device 560.

Here, when there is a request for output of commercial AC voltage to electric loads 201-203 external to vehicle 100, inverters 520, 530 cause a commercial AC voltage to be generated between neutral points N1, N2 of motor generators MG1, MG2. Specifically, inverter 520 drives motor generator MG1 to generate a commercial AC voltage between neutral points N1, N2 of motor generators MG1, MG2, while controlling the potential of neutral point N1, based on control signal PWM1 from control device 560. Inverter 530 drives motor generator MG2 to generate a commercial AC voltage between neutral points N1, N2 of motor generators MG1, MG2, while controlling the potential of neutral point N2, based on control signal PWM2 from control device 560.

An AC port 540 includes a voltage sensor and a current-sensor (both are not shown) for detecting a commercial AC voltage Vac and an AC current Iac, respectively, generated at AC output lines 60, 70. AC port 540 detects commercial AC voltage Vac and AC current Iac at AC output lines 60, 70, and outputs the detected values to control device 560.

Control device 560 generates control signal PWC for driving boost converter 510 based on torque command values and motor speeds of motor generators MG1, MG2, the battery voltage of battery B, and voltage Vdc of power supply line PL2, and outputs the generated control signal PWC to boost converter 510. The speeds of motor generators MG1, MG2, the voltage of battery B and the voltage of power supply line PL2 are detected by corresponding sensors, which are not shown.

Control device 560 also generates control signal PWM1 for driving motor generator MG1, based on voltage Vdc of power supply line PL2 and the motor current and the torque command value of motor generator MG1.

Here, when receiving a signal RQ designating an output request of commercial AC voltage from ECU 10, which is not shown, control device 560 generates control signal PWM1 such that a commercial AC voltage is generated between neutral points N1, N2 of motor generators MG1, MG2, while controlling the sum of duty of npn-type transistors Q11, Q13, Q15 on the upper arms and npn-type transistors Q12, Q14, Q16 on the lower arms.

Further, control device 560 generates control signal PWM2 for driving motor generator MG2, based on voltage Vdc of power supply line PL2 and the motor current and the torque command value of motor generator MG2.

Here, when receiving signal RQ designating an output request of commercial AC voltage, control device 560 generates control signal PWM2 such that a commercial AC voltage is generated between neutral points N1, N2 of motor generators MG1, MG2, while controlling the sum of duty of npn-type transistors Q21, Q23, Q25 on the upper arms and npn-type transistors Q22, Q24, Q26 on the lower arms. Control device 560 then outputs the generated control signal PWM2 to inverter 530.

Further, at the time of output of the commercial AC voltage, control device 560 calculates a power generation amount Pac from commercial AC voltage Vac and AC current Iac detected by the respective sensors included in AC port 540, and outputs the calculated power generation amount Pac to ECU 10. Control device 560 further controls the power generation amount Pac in accordance with an instruction from ECU 10. ECU 10 generates a signal P_CT controlling the power generation amount Pac of power supply apparatus 50 by power generation amount control means, which will be described later, and outputs the generated signal P_CT to control device 560. When receiving signal P_CT, control device 560 drives motor generator MG1 such that power generation amount Pac becomes equal to the power generation amount designated by signal P_CT.

Figure 3:
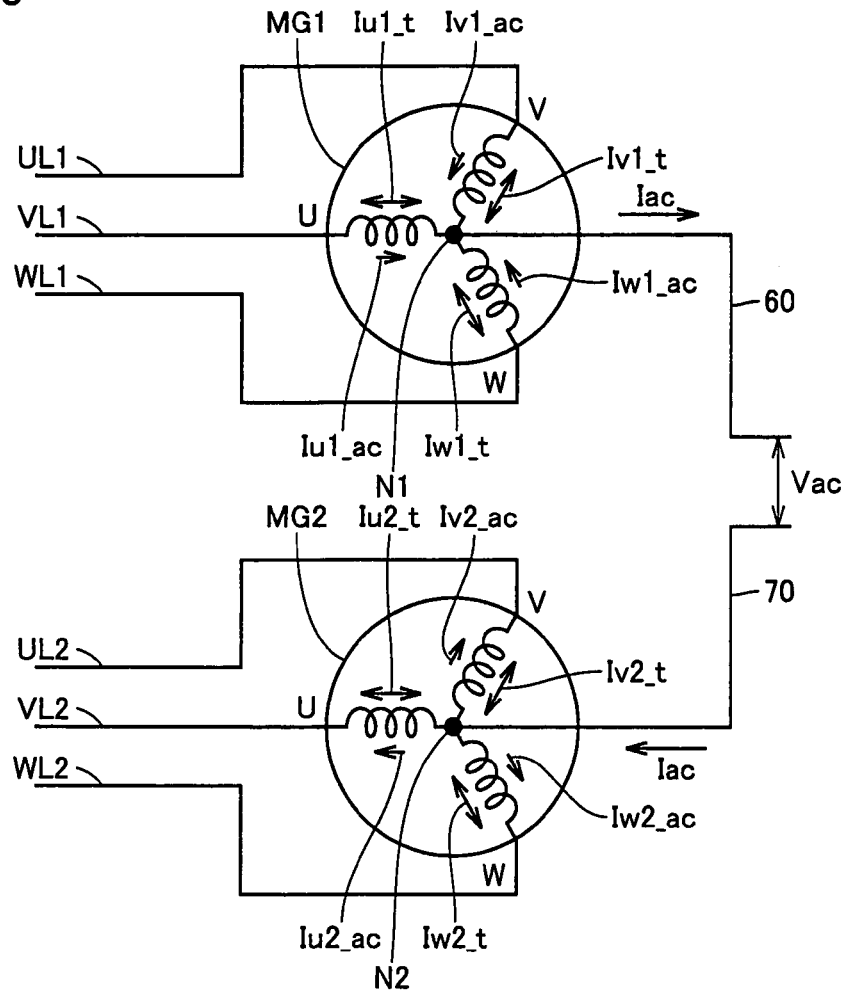
FIG. 3 illustrates currents supplied to motor generators MG1, MG2 for generating a commercial AC voltage Vac between neutral points N1, N2 of motor generators MG1, MG2 shown in FIG. 2.

FIG. 3 illustrates currents supplied to motor generators MG1, MG2 for generating commercial AC voltage Vac between neutral points N1, N2 of motor generators MG1, MG2. It is noted that FIG. 2 shows the case where AC current Iac is caused to flow from neutral point N1 of motor generator MG1 to neutral point N2 of motor generator MG2.

Referring to FIG. 3, inverter 520 (not shown) connected to U, V, W-phase lines UL1, VL1, WL1 performs a switching operation based on control signal PWM1 from control device 560 (not shown, hereinafter as well), to cause a U-phase current made of current components Iu1_t, Iu1_ac to flow through the U-phase coil of motor generator MG1, a V-phase current made of current components Iv1_t, Iv1_ac to flow through the V-phase coil of motor generator MG1, and a W-phase current made of current components Iw1_t, Iw1_ac to flow through the W-phase coil of motor generator MG1.

Further, inverter 530 (not shown) connected to U, V, W-phase lines UL2, VL2, WL2 performs a switching operation based on control signal PWM2 from control device 560, to cause a U-phase current Iu2, a V-phase current Iv2 and a W-phase current Iw2 to flow through the U, V and W-phase coils, respectively, of motor generator MG2.

Here, current components Iu1_t, Iv1_t and Iw1_t are for generating torque at motor generator MG1. Current components Iu1_ac, Iv1_ac and Iw1_ac are for causing AC current Iac to flow from neutral point N1 of motor generator MG1 to AC output line 60. U-phase current Iu2, V-phase current Iv2 and W-phase current Iw2 are for causing AC current Iac to flow from AC output line 70 to neutral point N2 of motor generator MG2. Current components Iu1_ac, Iv1_ac, Iw1_ac and U, V, W-phase currents Iu2, Iv2, Iw2 are equal in size with each other, and do not contribute to the torques of motor generators MG1, MG2. The total value of current components Iu1_ac, Iv1_ac, Iw1_ac and the total value of U, V, W-phase currents Iu2, Iv2, Iw2 each constitute AC current Iac.

Figure 4:
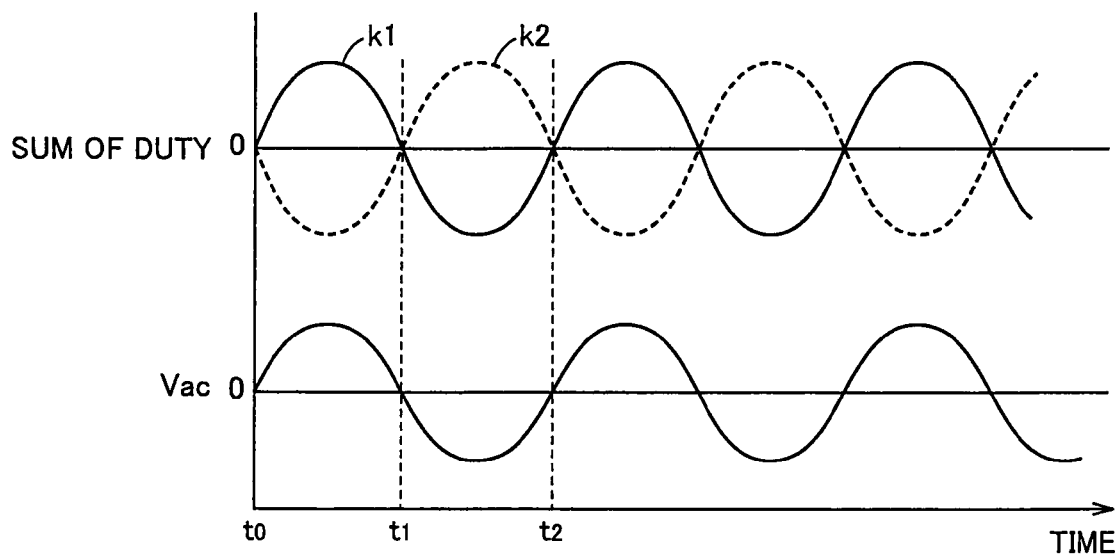
FIG. 4 is a waveform diagram showing sum of duty and commercial AC voltage Vac.

FIG. 4 is a waveform diagram showing sum of duty and commercial AC voltage Vac.

Referring to FIG. 4, a curved line k1 indicates a change in the sum of duty with the switching control of inverter 520, and a curved line k2 indicates a change in the sum of duty with the switching control of inverter 530. Here, the sum of duty refers to a value obtained by subtracting on-duty of the lower arms from on-duty of the upper arms in each inverter.

In FIG. 3, that the sum of duty is positive means that the potential of the neutral point of the corresponding motor generator is higher than an intermediate value (Vdc/2) of voltage Vdc that is the inverter input voltage (voltage on power supply line PL2 in FIG. 2), while that the sum of duty is negative means that the potential of the neutral point is lower than voltage Vdc/2.

In power supply apparatus 50, control device 560 causes the sum of duty in inverter 520 to periodically change at the commercial frequency in accordance with curved line k1, and causes the sum of duty in inverter 530 to periodically change at the commercial frequency in accordance with curved line k2. Here, the sum of duty in inverter 530 is changed periodically at the phase inverted from the changing phase of the sum of duty in inverter 520.

Consequently, from time t0 to time t1, the potential at neutral point N1 is higher than voltage Vdc/2, and the potential at neutral point N2 is lower than voltage Vdc/2, so that commercial AC voltage Vac on the positive side is generated between neutral points N1, N2. Here, when a connector 30 on the house 1000 side is connected to connector 20 in FIG. 1, the excess current that cannot flow from the upper arms to the lower arms of inverter 520 flows from neutral point N1 via AC output line 60, an external load and AC output line 70 to neutral point N2, and then flows from neutral point N2 to the lower arms of inverter 530.

From time t1 to time t2, the potential at neutral point N1 is lower than voltage Vdc/2, and the potential at neutral point N2 is higher than voltage Vdc/2, and thus, commercial AC voltage Vac on the negative side is generated between neutral points N1, N2. The excess current that cannot flow from the upper arms to the lower arms of inverter 530 flows from neutral point N2 via AC output line 70, an external load and AC output line 60 to neutral point N1, and then flows from neutral point N1 to the lower arms of inverter 520.

In this manner, inverters 520, 530 can generate commercial AC voltage Vac between neutral points N1, N2 of motor generators MG1, MG2, while driving and controlling motor generators MG1, MG2.

Referring again to FIG. 1, connector 20 of vehicle 100 is coupled to connector 30 for input of commercial AC power which is provided in house 1000. This establishes electrical connection between AC output line 60 on the vehicle side and a power supply line 62 provided on the house side, and between AC output line 70 on the vehicle side and a ground line 72 provided on the house side.

ECU 10 controls the entire vehicle during normal driving of vehicle 100. When power supply apparatus 50 mounted on vehicle 100 is to be used as an emergency power source of commercial power supply, ECU 10 generates signal RQ designating a request for generation of commercial AC voltage, in response to the event that connector 20 is coupled to connector 30 on the house side, and outputs the generated signal RQ to control device 560 of power supply apparatus 50.

Further, at the time of generation of commercial AC power, ECU 10 generates signal P_CT for causing commercial AC power of a desired power generation amount to be generated from power supply apparatus 50 by power generation amount control means, as will be described later, and outputs the generated signal P_CT to power supply apparatus 50.

Figure 5:
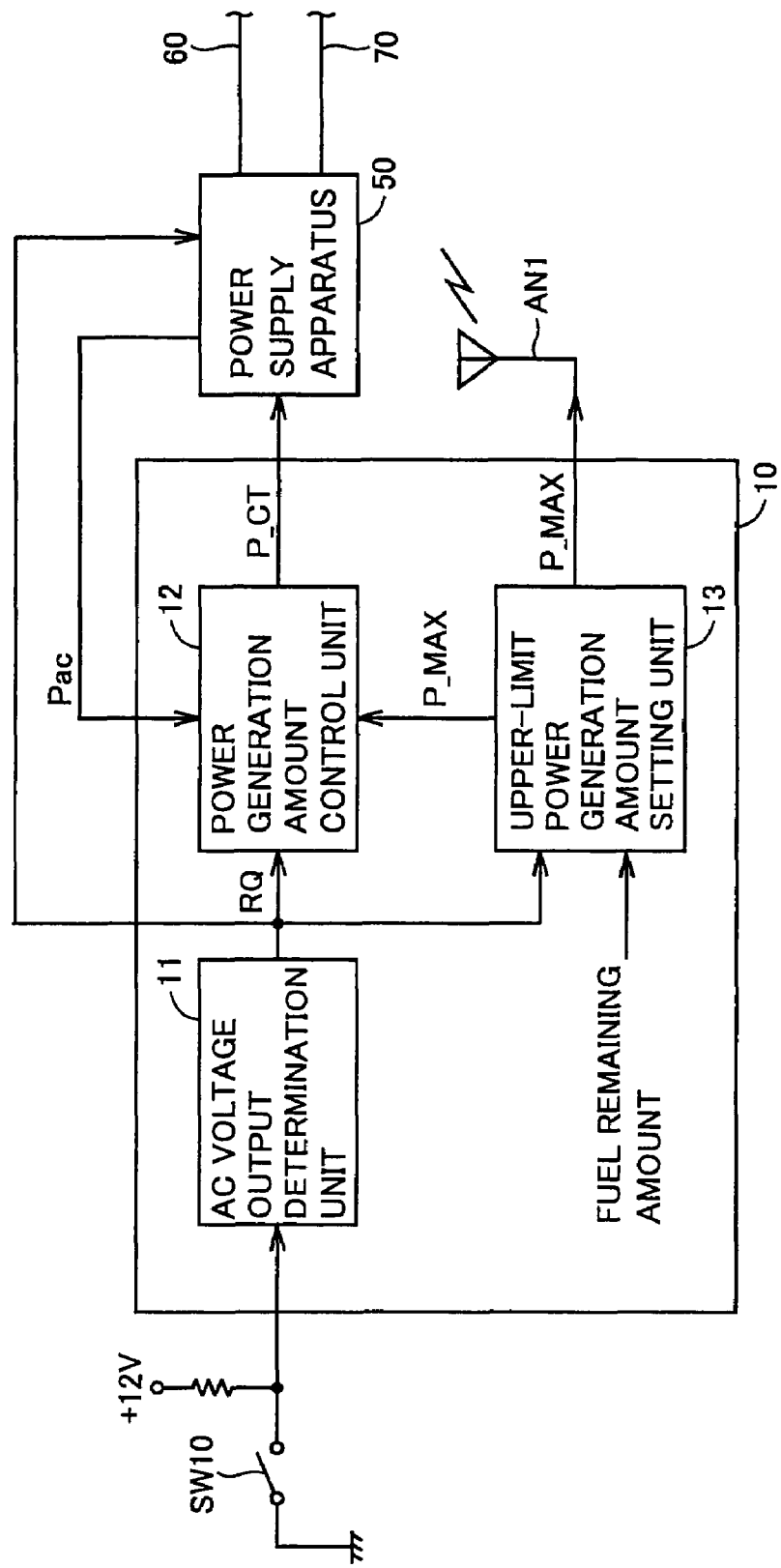
FIG. 5 is a schematic block diagram of an ECU in the AC power supplying system in FIG. 1.

FIG. 5 is a schematic block diagram of ECU 10 in the AC power supplying system in FIG. 1.

Referring to FIG. 5, ECU 10 includes an AC voltage output determination unit 11, a power generation amount control unit 12, an upper-limit power generation amount setting unit 13, and an antenna AN1.

AC voltage output determination unit 11 is made conductive to an auxiliary machine battery, not shown, in response to the event that connector 20 on the vehicle 100 side is coupled to connector 30 on the house 1000 side (which corresponds to turning on of switch circuit SW10). When AC voltage output determination unit 11 attains the conductive state, it determines that generation of commercial AC voltage is requested, and generates and outputs signal RQ designating a request for generation of commercial AC voltage to power generation control unit 12 and upper-limit power generation amount control unit 13 as well as to control device 560 of power supply apparatus 50, which is not shown.

Upper-limit power generation amount setting unit 13 sets an upper limit of power amount that can be generated (hereinafter, also referred to as "upper-limit power generation amount P_MAX") based on the remaining amount of fuel. In detail, upper-limit power generation amount setting unit 13 receives a remaining amount of fuel of the engine (gasoline and the like) as fuel information. Upper-limit power generation amount setting unit 13 then sets upper-limit power generation amount P_MAX such that the remaining amount of fuel does not become lower than a prescribed threshold value. The prescribed threshold value is set to the fuel amount necessary for the vehicle to run to the nearest fueling station by itself.

As a way of setting upper-limit power generation amount P_MAX, upper-limit power generation amount setting unit 13 has a fuel remaining amount slightly greater than the prescribed-threshold value as a reference value, for example. When the actual fuel remaining amount becomes equal to or lower than this reference value, it gradually decreases the upper-limit power generation amount P_MAX along with the decrease of the fuel remaining amount. When the fuel remaining amount reaches the prescribed threshold value, upper-limit power generation amount setting unit 13 set the upper-limit power generation amount P_MAX to zero. As such, the power generating operation of power supply apparatus 50 is stopped.

Once setting upper-limit power generation amount P_MAX, upper-limit power generation amount setting unit 13 transmits the set upper-limit power generation amount P_MAX to on-premises ECU 200 via antenna AN1. The transmitted upper-limit power generation amount P_MAX is received by on-premises ECU 200 via an antenna AN10 provided at on-premises ECU 200.

Power generation amount control unit 12 controls the power generation amount of power supply apparatus 50 based on the set upper-limit power generation amount P_MAX. In detail, power generation amount control unit 12 receives power generation amount Pac from control device 560 of power supply apparatus 50, and receives upper-limit power generation amount P_MAX from upper-limit power generation amount setting unit 13. Power generation amount control unit 12 controls such that the power generation amount of power supply apparatus 50 is equal to or less than upper-limit power generation amount P_MAX. At this time, when determining that power generation amount Pac has exceeded upper-limit power generation amount P_MAX, power generation amount control unit 12 generates a signal P_CT for causing power generation amount Pac to become equal to or lower than upper-limit power generation amount P_MAX, and outputs the same to control device 560 of power supply apparatus 50. In this manner, power generation amount Pac of power supply apparatus 50 is controlled not to exceed upper limit power generation amount P_MAX all the time.

Figure 6:
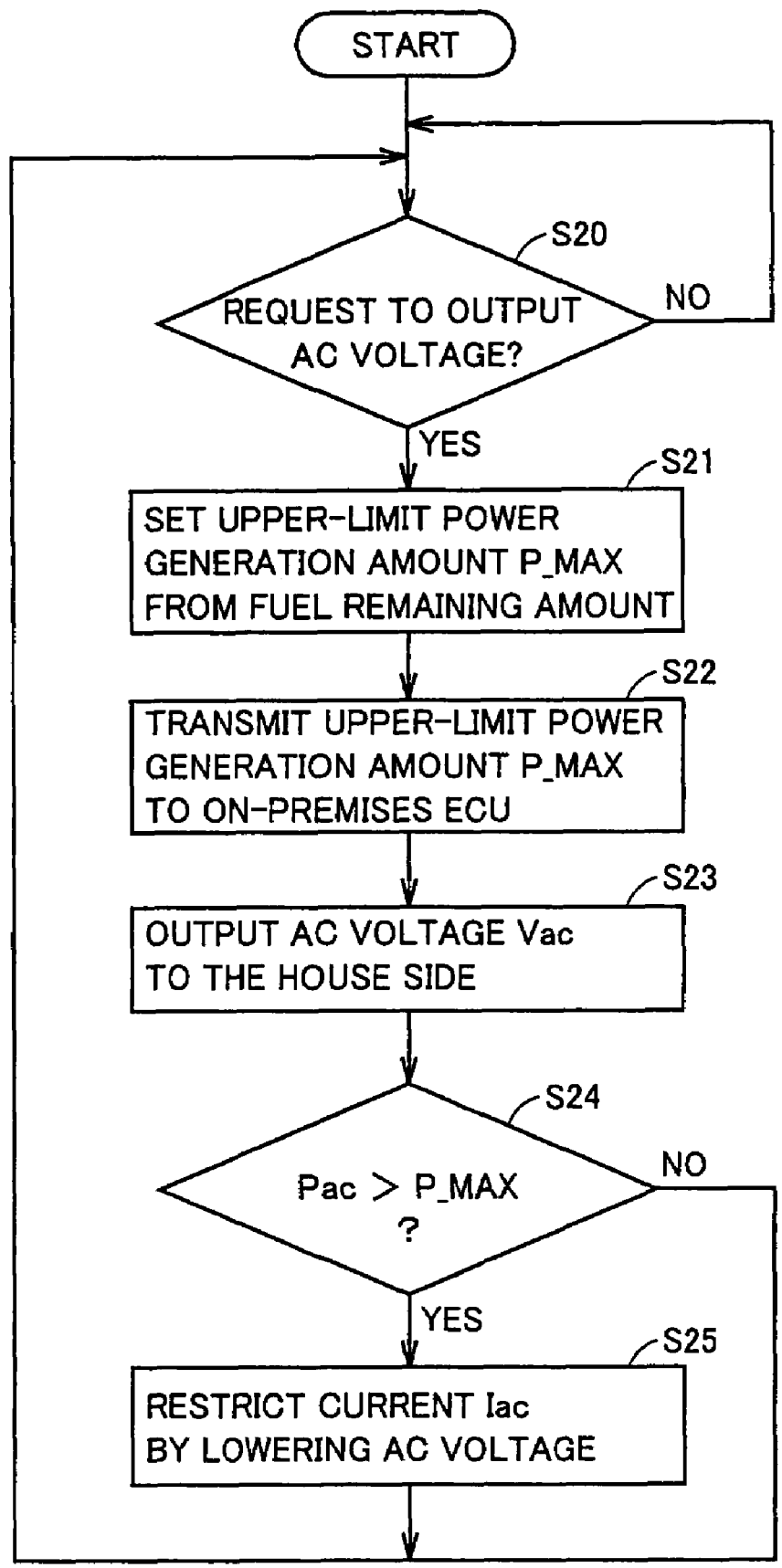
FIG. 6 is a flowchart illustrating a control operation of a power generation amount in the ECU in FIG. 5.

FIG. 6 is a flowchart illustrating a control operation of power generation amount Pac by ECU 10 of FIG. 5.

Referring to FIG. 6, firstly, AC voltage output determination unit 11 determines that generation of commercial AC voltage has been requested, based on the event that connector 20 on the vehicle side is coupled to connector 30 on the house side, and outputs signal RQ designating a request for generation of commercial AC voltage to power generation amount control unit 12, upper-limit power generation amount setting unit 13, and control device 560 of power supply apparatus 50 (step S20).

Upper-limit power generation amount setting unit 13, in receipt of signal RQ, sets upper-limit power generation amount P_MAX based on the fuel remaining amount (step S21). Specifically, upper-limit power generation amount setting unit 13 has a fuel remaining amount slightly greater than a prescribed threshold value as a reference value, and when the fuel remaining amount becomes equal to or lower than this reference value, it gradually decreases upper-limit power generation amount P_MAX along with the decrease of the fuel remaining amount. When the fuel remaining amount reaches the prescribed threshold value, upper-limit power generation amount setting unit 13 sets upper-limit power generation amount P_MAX to zero.

Upper-limit power generation amount setting unit 13 outputs the set upper-limit power generation amount P_MAX to power generation amount control unit 12 and also transmits the same to on-premises ECU 200 via antenna AN1 (step S22).

In power supply apparatus 50, in response to input of signal RQ, control device 560 generates signals PWM1, PWM2 for driving inverters 520, 530 to generate a commercial AC voltage between the neutral points of motor generators MG1, MG2, and outputs the signals to inverters 520, 530, respectively. Consequently, a commercial AC voltage is output from power supply apparatus 50 via AC output lines 60 and 70 (step S23). Control device 50 calculates power generation amount Pac based on commercial AC voltage Vac and AC current Iac detected by the respective sensors of AC port 540, and outputs the calculated power generation amount Pac to power generation amount control unit 12.

Power generation amount control unit 12, in receipt of power generation amount Pac from control device 560, controls power generation amount Pac of power supply apparatus 50 based on upper-limit power generation amount P_MAX having been set. Power generation amount control unit 12 determines whether power generation amount Pac is greater than upper-limit power generation amount P_MAX (step S24). When power generation amount control unit 12 determines that power generation amount Pac is greater than upper-limit power generation amount P_MAX it generates signal P_CT for causing power generation amount Pac not to exceed upper-limit power generation amount P_MAX, and outputs the same to control device 560 of power supply apparatus 50 (step S25).

As described above, according to the present invention, in the case of using power supply apparatus 50 of vehicle 100 as an emergency power source of commercial power supply, the commercial AC power output from power supply apparatus 50 is supplied to electric loads 201-203 inside house 1000, with the power generation amount being controlled based on the fuel remaining amount in vehicle 100. In house 1000, the load state is controlled such that the load amounts of electric loads 201-203 will not exceed the power amount supplied from power supply apparatus 50, so as to suppress voltage drop of the commercial AC voltage, which will be described below.

Referring again to FIG. 1, house 1000 is provided with on-premises ECU 200, antenna AN10, first through third loads 201-203, switch circuits SW1-SW3, connectors 211-214, an automatic switching device 300, and current sensors 44-46.

On-premises ECU 200 and first through third loads 201-203 are electrically connected to a power supply line 66 and a ground line 76 provided inside house 1000. Power supply line 66 and ground line 76 are selectively connected to power supply line 64 and ground line 74 of a commercial power source, or to power supply line 62 and ground line 72 extending from connector 30 coupled to vehicle 100, as shown in FIG. 1.

More specifically, when it is possible to supply power from the commercial power source, the relay of automatic switching device 300 is energized, and power supply line 66 and ground line 76 are electrically connected to power supply line 64 and ground line 74, respectively, on the commercial power source side.

Upon power failure of the commercial power source, during which it is not possible to supply power from the commercial power source, the relay of automatic switching device 300 is not energized, and power supply line 66 and ground line 76 are electrically connected to AC output line 60 and AC output line 70, respectively, on the vehicle side. When the commercial power source recovers from the power failure state and power supply from the commercial power source becomes possible again, power supply line 66 and ground line 76 are again electrically connected to power supply line 64 and ground line 74, respectively, on the commercial power source side.

First through third loads 201-203 correspond to various household electric appliances provided in house 1000, which may be, for example, a lighting apparatus, a refrigerator, an air conditioner, a broadcast receiver, and the like. Thus, first through third loads 201-203 have load amounts different in size from each other due to the structural differences.

In the present embodiment, first through third loads 201-203 have their priorities get in advance by a user (owner of house 1000 or the like), and they are registered at on-premises ECU 200 together with the set priorities. In FIG. 1, first load 201 is assigned with the highest priority (corresponding to priority level 1), and third load 203 is assigned with the lowest priority (corresponding to priority level 3). It is noted that the priorities may be set arbitrarily in accordance with importance of respective electric loads 201-203 for the user. As an example, a lighting apparatus may be assigned with a relatively high priority, taking account of power failure taking place in the nighttime. As another example, a productive facility that would considerably be affected by power failure may be assigned with a relatively high priority.

First through-third loads 201-203 are each coupled to corresponding one of connectors 211-213, and thus, electrically connected to power supply line 66 and ground line 76. Further, switch circuits SW1-SW3 are provided on power supply line 66 and ground line 76 extending to connectors 211-213, respectively.

Switch circuits SW1-SW3 are energized and turned on by switching currents IS1-IS3, respectively, output from on-premises ECU 200, and electrically connect power supply line 66 and ground line 76 to corresponding ones of first through third loads 201-203. In this manner, the commercial AC power is supplied to any of first through third loads 201-203 corresponding to switch circuit(s) SW1-SW3 in the on state.

Current sensors 44-46 detect currents IL1-IL3 flowing through power supply line 66 to corresponding ones of first through third loads 201-203, and output the detected currents IL1-IL3 to on-premises ECU 200.

On-premises ECU 200 receives the commercial AC voltage via power supply line 66 and ground line 76, receives currents IL1-IL3 from current sensors 44-46, and receives upper-limit power generation amount P_MAX of power supply apparatus 50 via antenna AN10. On-premises ECU 200 then generates switching currents IS1-IS3 for controlling on/off of switch circuits SW1-SW3 in a manner as will be described later, and outputs the generated switching currents IS1-IS3 to switch circuits SW1-SW3, respectively.

Figure 7:
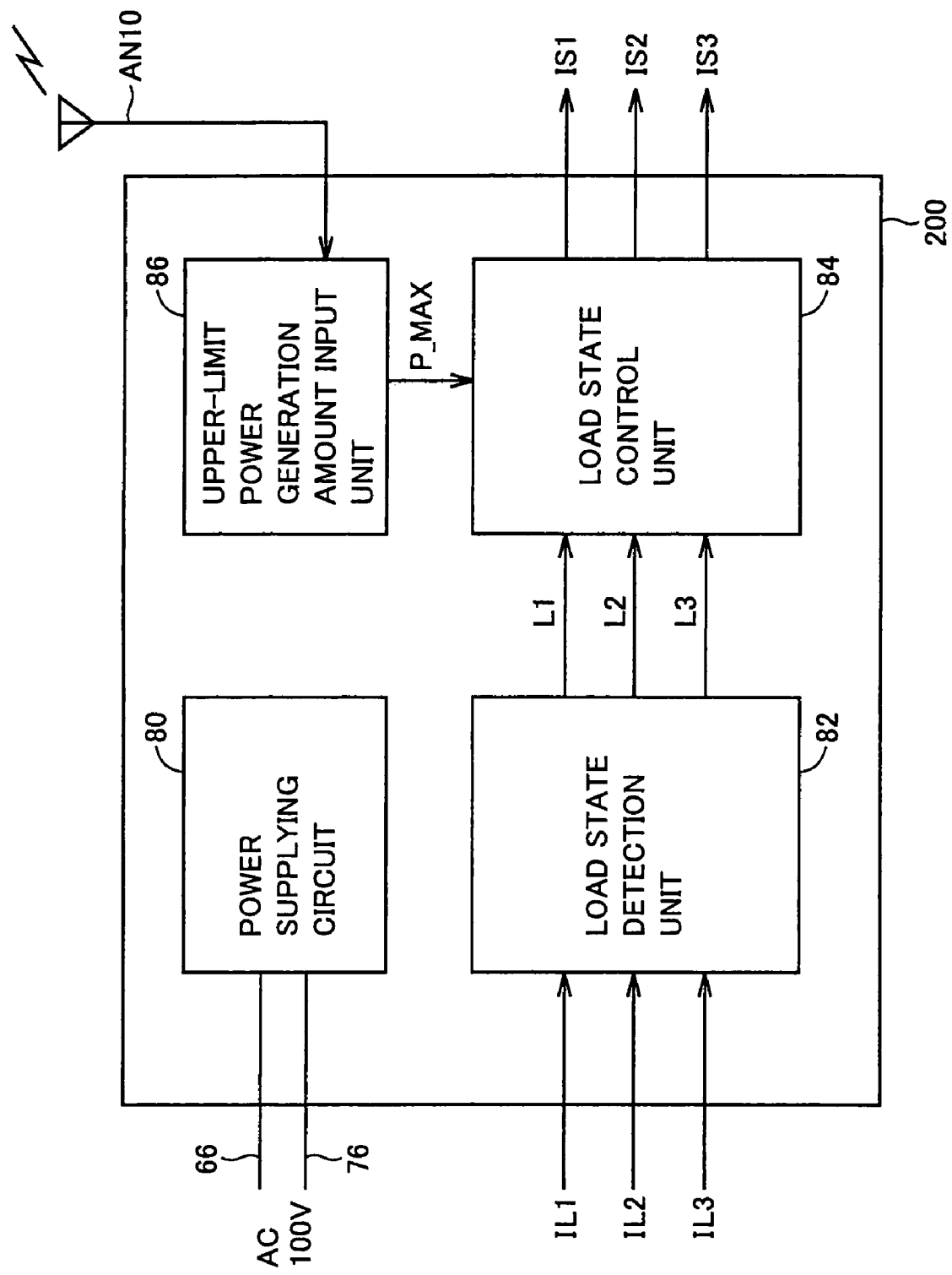
FIG. 7 is a functional block diagram of an on-premises ECU in FIG. 1.

FIG. 7 is a functional block diagram of on-premises ECU 200 in FIG. 1.

Referring to FIG. 7, on-premises ECU 200 includes a power supplying circuit 80, a load state detection unit 82, a load state control unit 84, an upper-limit power generation amount input unit 86, and antenna AN10.

Power supplying circuit 80 is connected to power supply line 66 and ground line 76, and receives a commercial AC voltage from a commercial power source or from power supply apparatus 50 of vehicle 100. Power supplying circuit 80 supplies the received commercial AC voltage to the respective parts of on-premises ECU 200.

Load state detection unit 82, in receipt of currents IL1-IL3 supplied from current sensors 44-46 to first through third loads 201-203, calculates load amounts L1-L3 of first through third loads 201-203 based on the currents IL1-IL3. Load state detection unit 82 then outputs the calculated load amounts L1-L3 to load state control unit 84.

Load state control unit 84 receives upper-limit power generation amount P_MAX from upper-limit power generation amount input unit 86, and receives load amounts L1-L3 from load state detection unit 82. Further, load state control unit 84 has information regarding priorities of first through third loads 201-203 which are registered in advance.

Figure 8:
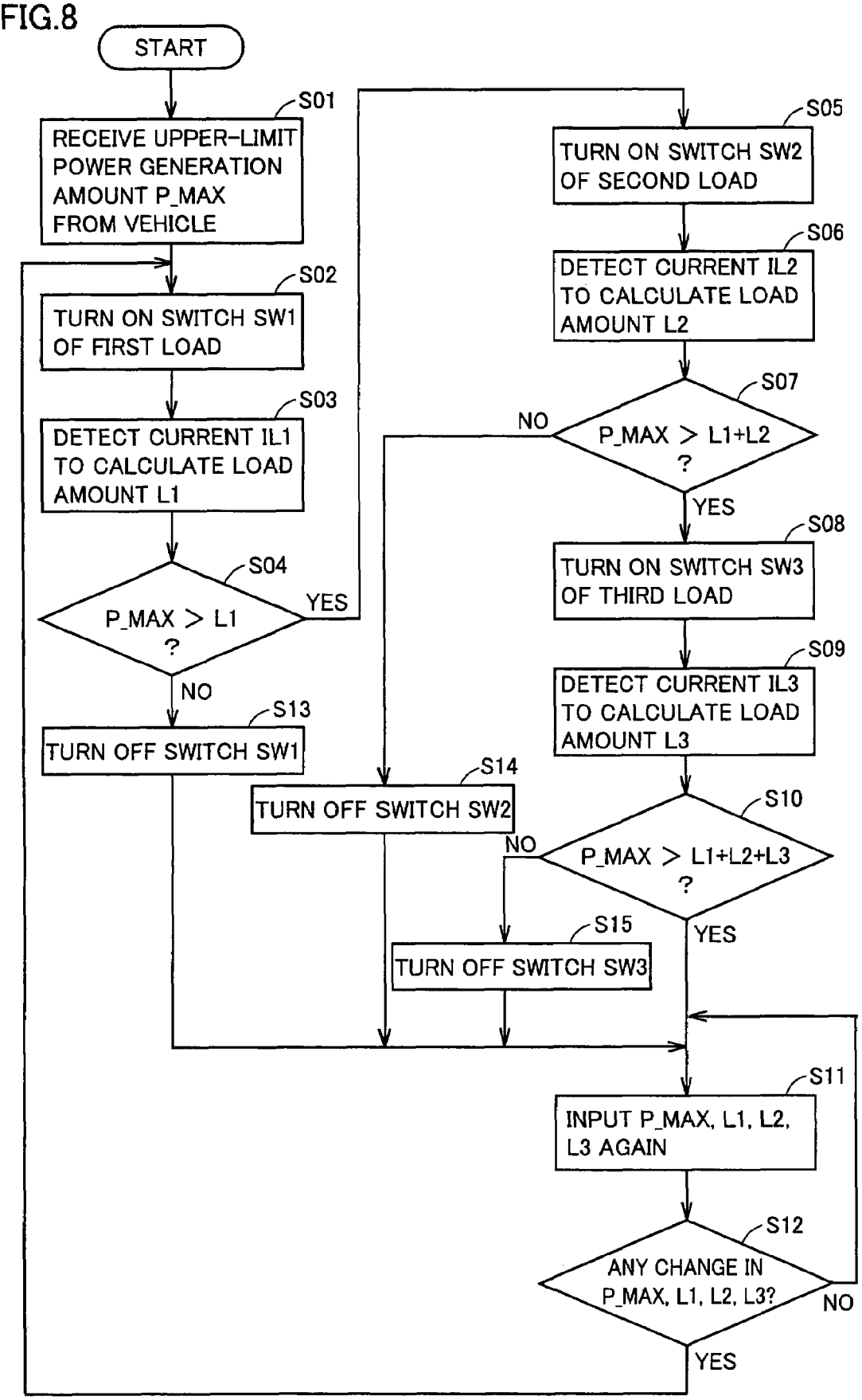
FIG. 8 is a flowchart illustrating a control operation of a load state in a load state control unit in FIG. 7.

Load state control unit 84 controls the states of the loads supplied with commercial AC power, based on upper-limit power generation amount P_MAX and load amounts L1-L3, in accordance with the flow shown in FIG. 8.

FIG. 8 is a flowchart illustrating a control operation of the load state in load state control unit 84 of FIG. 7.

Referring to FIG. 8, load state control unit 84 firstly receives upper-limit power generation amount P_MAX from upper-limit power generation amount input unit 86 (step S01). Upper-limit power generation amount P_MAX is set based on the fuel remaining amount in vehicle 100, and transmitted through antennas AN1, AN10 to on-premises ECU 200, as described above.

Next, load state control unit 84 supplies commercial AC power to first load 201, which is the load of highest priority (corresponding to priority level 1), based on the information regarding the registered priorities. Specifically, load state control unit 84 outputs switching current IS1 to switch circuit SW1 arranged on power supply line 66 and ground line 76 coupled to first load 201. As such, switch circuit SW1 is energized and turned on by switching current IS1 (step S02). As a result, the commercial AC power is supplied to first load 201.

When the commercial AC power is supplied to first load 201, load state detection unit 82 calculates load amount L1 of first load 201 based on a detected result of current IL1 from current sensor 44 (step S03). Load state detection unit 82 outputs the calculated load amount L1 to load state control unit 84.

In receipt of load amount L1 of first load 201 from load state detection unit 82, load state control unit 84 determines whether upper-limit power generation amount P_MAX is greater than load amount L1 (step S04). If load state control unit 84 determines that upper-limit power generation amount P_MAX is not more than load amount L1, it sets switching current IS1 to zero to turn off switch circuit SW1 (step S13). In this manner, the supply of the commercial AC power to first load 201 is stopped.

If load state control unit 84 determines in step S04 that upper-limit power generation amount P_MAX is greater than load L1, it supplies the commercial AC power to second load 202 having the highest priority next to first load 201 (corresponding to priority level 2), in addition to first load 201. Specifically, while continuously outputting switching current IS1, load state control unit 84 also outputs switching current IS2 to switch circuit SW2 arranged on power supply line 66 and ground line 76 coupled to second load 202. In this manner, switch circuit SW2 is energized and turned on by switching current IS2 (step S05). As a result, the commercial AC power is supplied to both first load 201 and second load 202.

When the commercial AC power is supplied to second load 202 as well, load state detection unit 82 calculates load amount L2 of second load 202 based on a detected result of current IL2 from current sensor 45 (step S06). Load state detection unit 82 then outputs the calculated load amount L2 to load state control unit 84.

In receipt of load amount L2 of second load 202 from load state detection unit 82, load state control unit 84 obtains a sum of the load amounts by adding load amount L1 and load amount L2, and determines whether upper-limit power generation amount P_MAX is greater than the sum of the load amounts (=L1+L2) (step S07). If it determines that upper-limit power generation amount P_MAX is not more than the sum of the load amounts (L1+L2), load state control unit 84 sets switching current IS2 to zero to turn off switch circuit SW2 (step S14). As such, the supply of the commercial AC power to second load 202 is stopped. It is noted that the supply of the commercial AC power to first load 201 of priority level 1 is continued even after step S02. That is, power is continuously supplied to the electric appliance of high priority even after power failure, so that it can be said that the influence of the power failure on the user is smaller than in the case of a conventional AC power supplying system.

If load state control unit 84 determines in step S07 that upper-limit power generation amount P_MAX is greater than the sum of the load amounts (L1+L2), it supplies the commercial AC power to third load 203 of the lowest priority (corresponding to priority level 3) in addition to first load 201 and second load 202. Specifically, load state control unit 84 outputs switching current IS3 to switch circuit SW3 arranged on power supply line 66 and ground line 76 coupled to third load 203, while continuously outputting switching currents IS1 and IS2. In this manner, switch circuit SW3 is energized and turned on by switching current IS3 (step S08). As a result, the commercial AC power is supplied to first load 201, second load 202 and third load 203.

When the commercial AC power is supplied to third load 203 as well, load state detection unit 82 calculates load amount L3 of third load 203 based on a detected result of current IL3 from current sensor 46 (step S09). Load state detection unit 82 outputs the calculated load amount L3 to load state control unit 84.

In receipt of load amount L3 of third load 203 from load state detection unit 82, load state control unit 84 obtains a sum of the load amounts by adding load amounts L1, L2 and L3, and determines whether upper-limit power generation amount P_MAX is greater than the sum of the load amounts (=L1+L2+L3) (step S10). If load state control unit 84 determines that upper-limit power generation amount P_MAX is not more than the sum of the load amounts (=L1+L2+L3), it sets switching current IS3 to zero to turn off switch circuit SW3 (step S15). As such, the supply of the commercial AC power to third load 203 is stopped. It is noted that the supply of the commercial AC power to first load 201 of priority level 1 and to second load 202 of priority level 2 is continued even after steps S02, S05, respectively.

If load state control unit 84 determines in step S10 that upper-limit power generation amount P_MAX is greater than the sum of the load amounts (=L1+L2+L3), it continues the supply of the commercial AC power to each of first through third loads 201-203.

After the commercial AC power is supplied to first through third loads 201-203 according to the above-described steps S02-S10, load state control unit 84 is provided again with upper-limit power generation amount P_MAX and load amounts L1-L3 of first through third loads 201-203 (step S11). Of these input values, particularly upper-limit power generation amount P_MAX changes depending on the remaining amount of the fuel.

Thus, if load state control unit 84 determines that at least one of the input upper-limit power generation amount P_MAX and load amounts L1-L3 has changed (step S12), it returns to step S02, and controls the load state based on the upper-limit power generation amount P_MAX and load amounts L1-L3 after such change. If load state control unit 84 determines that there is no change in the input values, it maintains the load state having been set at the time of completion of step S10.

In addition to the control of the load state upon power failure of a commercial power source, on-premises ECU 200 also controls the load state after recovery of the commercial power source, in order to suppress drop of the commercial AC voltage.

In detail, when the commercial power source recovers from power failure, on-premises ECU 200 and first through third loads 201-203 are automatically switched from the state connected to power supply apparatus 50 to the state connected to the commercial power source by automatic switching device 300.

Immediately after recovery of the commercial power source, however, the power generation amount of the commercial AC power may be lower than a normal level. Further, if the power generation amount of the commercial power source immediately after recovery is lower than upper-limit power generation amount P_MAX of power supply apparatus 50 that supplied power to electric loads 201-203 before recovery of the commercial power source, the supply amounts of the commercial AC power to electric loads 201-203 become smaller than the load amounts of electric loads 201-203, causing voltage drop of the commercial AC voltage.

Thus, as means for suppressing the voltage drop at the time of recovery of the commercial power source, load state control unit 84 of on-premises ECU 200 compares the power generation amount at the recovery of the commercial power source with upper-limit power generation amount P_MAX, and if it determines that the power generation amount of the commercial power source is smaller than upper-limit power generation amount P_MAX, it controls the states of the loads supplied with the commercial AC power, based on the power generation amount of the commercial power source. The control of the load state at this time is similar to the control of the load state shown in FIG. 7, which is carried out such that the commercial AC power is supplied firstly to first load 201 of high priority, according to the priorities registered in advance, and such that the sum of the load amounts of electric loads 201-203 will not exceed the power generation amount of the commercial power source.

In this manner, it is possible to suppress drop of the commercial AC voltage both upon power failure of the commercial power source and upon recovery thereof. This enables automatic switching of the power source at the times of power failure and recovery of the commercial power source.

Although the first embodiment has been configured such that upper-limit power generation amount P_MAX is transmitted from ECU 10 of hybrid vehicle 100 to on-premises ECU 200 through wireless communication via both antennas AN1 and AN10, it may be transmitted through wire communication using the power lines (power supply line 66 and ground line 76) arranged between power supply apparatus 50 of hybrid vehicle 100 and on-premises ECU 200 as the communication media.

As described above, according to the first embodiment of the present invention, in the configuration where commercial AC power is supplied from the power supply apparatus mounted on the vehicle in place of a commercial power source, the load state is controlled such that it does not exceed an upper limit of amount of power that can be generated by the power supply apparatus, which makes it possible to suppress drop of the commercial AC voltage that would otherwise occur when switching the power source from the commercial power source to the power supply apparatus. Accordingly, it is possible to automatically switch the power source upon power failure of the commercial power source.

Further, at the time of recovery of the commercial power source as well, the load state is controlled so as not to exceed the power generation amount of the commercial power source, and accordingly, it is possible to automatically switch the power source from the power supply apparatus to the commercial power source.

Still further, the load state is controlled such that the commercial AC power is supplied to the one having higher priority, which can decrease the influence exerted on the user.

Second Embodiment

Figure 9:
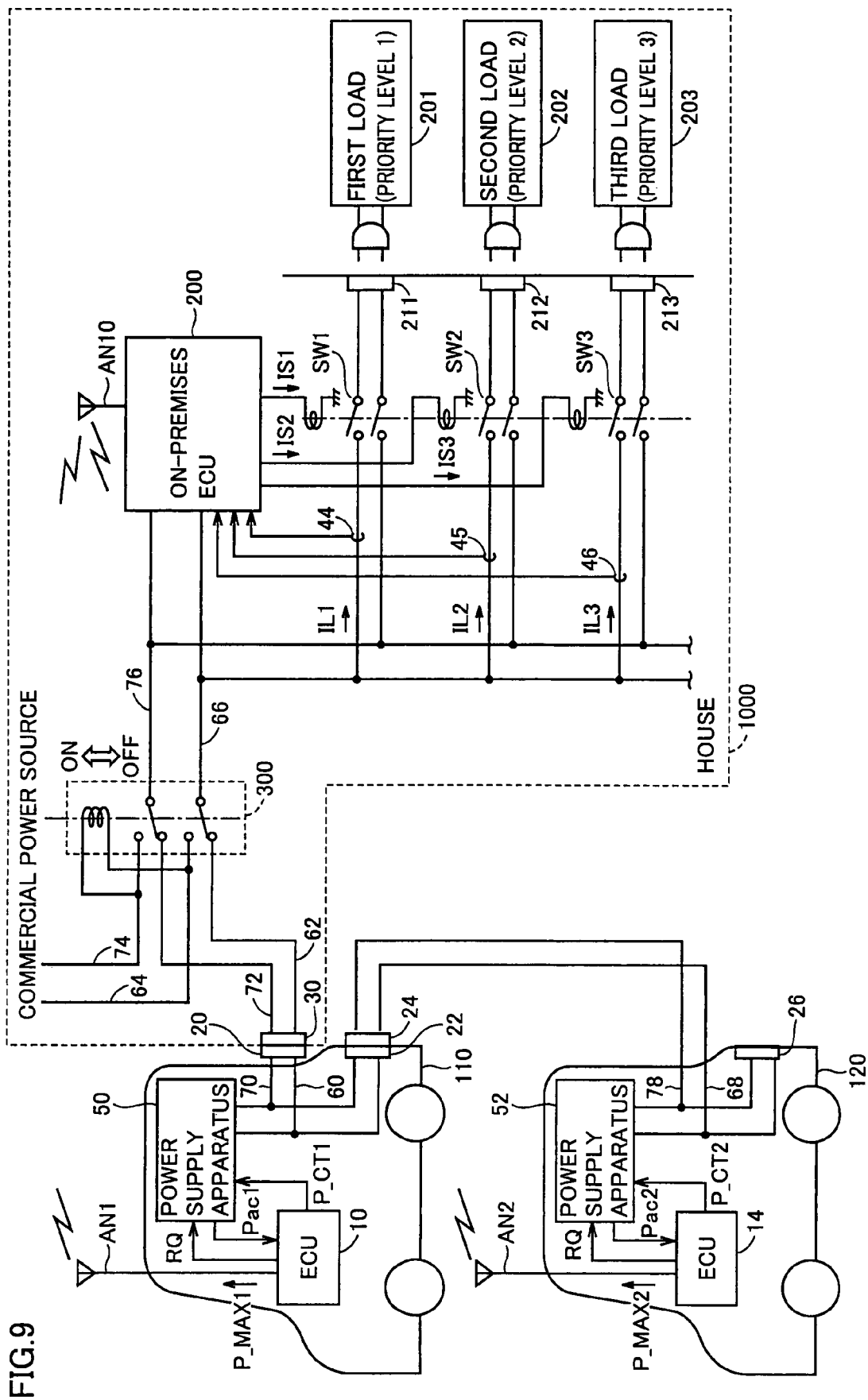
FIG. 9 is a schematic block diagram illustrating an AC power supplying system according to a second embodiment of the present invention.

FIG. 9 is a schematic block diagram illustrating an AC power supplying system according to the second embodiment of the present invention.

Referring to FIG. 9, the AC power supplying system includes a commercial power source and power supply apparatuses 50, 52 as power sources for a plurality of electric loads (first through third loads 201-203) provided in the house 1000. The AC power supplying system in FIG. 9 differs from the AC power supplying system in FIG. 1 in that single power supply apparatus 50 is replaced with a plurality of power supply apparatuses 50, 52. The configuration of house 1000 is the same as in FIG. 1.

Power supply apparatuses 50, 52 are mounted on vehicles 110, 120, respectively. Each of vehicles 110, 120 is a hybrid vehicle, for example, which has the configuration similar to that of hybrid vehicle 100 in FIG. 1. In detail, vehicle 110 includes the power supply apparatus 50, an ECU 10, an antenna AN1, a connector 20 for output of commercial AC power, a connector 22 for input of commercial-AC power, and AC output lines 60, 60. Vehicle 120 includes the power supply apparatus 52, an ECU 14, an antenna AN2, a connector 24 for output of commercial AC power, a connector 26 for input of commercial AC power, and AC output lines 68, 78.

Power supply apparatuses 50, 52 each have the configuration the same as that of power supply apparatus 50 shown in FIG. 2. That is, power supply apparatuses 50, 52 generate commercial AC voltage Vac between neutral points N1, N2 of motor generators MG1, MG2, in receipt of a request for generation of commercial AC voltage from ECU 10, 14, respectively.

Connector 24 is coupled to connector 22 for input of commercial AC power provided at vehicle 110. As such, AC output line 60 of vehicle 110 is electrically connected to AC output line 68 provided at vehicle 120, and AC output line 70 of vehicle 110 is electrically connected to AC output line 78 provided at vehicle 120.

ECU 10, 14 each have the configuration the same as that of ECU 10 shown in FIG. 2. That is, when hybrid vehicles 110, 120 are used as the power sources of the AC power supplying system, ECU 10, 12 control the power generation amounts of corresponding power supply apparatuses 50, 52 based on the fuel remaining amount, as described above.

More specifically, ECU 10 sets an upper-limit power generation amount P_MAX1 of power supply apparatus 50 based on the fuel remaining amount, and controls the power generation amount Pac according to the set upper-limit power generation amount P_MAX1, as described in conjunction with FIG. 5. Further, ECU 10 transmits upper-limit power generation amount P_MAX1 to on-premises ECU 200 via antenna AN1.

ECU 14, similar to ECU 10, sets an upper-limit power generation amount P_MAX2 of power supply apparatus 52 based on the fuel remaining amount, and controls the power generation amount Pac according to the set upper-limit power generation amount P_MAX2. ECU 14 transmits upper-limit power generation amount P_MAX2 to on-premises ECU 200 via antenna AN2.

Further, in the case of operating a plurality of power supply apparatuses in parallel as in the present embodiment, ECU 10 outputs a synchronous signal to ECU 14 so as to synchronously control power supply apparatuses 50, 52 to cause the commercial AC voltages output from them to be in phase. More specifically, with ECU 10 serving as a master and ECU 14 serving as a slave, ECU 10 outputs to ECU 14 a synchronous signal designating a synchronization timing. ECU 14 controls power supply apparatus 52 using the synchronous signal from ECU 10 as a trigger. As a result, the commercial AC voltages that are in phase and free of distortion are output from power supply apparatuses 50, 52. The synchronous signal may be transmitted through wireless communication using antennas AN1, AN2 of ECU 10, 14, or through wire communication using power lines coupled to connectors 22, 24.

In on-premises ECU 200, upper-limit power generation amount input unit 86 receives upper-limit power generation amounts P_MAX1, P_MAX2 transmitted from ECU 10, 14 via antenna AN10. Upper-limit power generation amount input unit 86 adds these upper-limit power generation amounts P_MAX1, P_MAX2, and outputs the added result as upper-limit power generation amount P_MAX to load state control unit 84.

Load state control unit 84 controls the load state based on upper-limit power generation amount P_MAX in accordance with the flowchart shown in FIG. 7.

Here, upper-limit power generation amounts P_MAX1, P_MAX2 input from the respective ECU 10, 14 to on-premises ECU 200 would change independently from each other in response to the fuel remaining amount, as described above. For example, when the remaining amount of fuel in vehicle 120 is lower than a prescribed threshold value, upper-limit power generation amount P_MAX2 becomes zero. Thus, upper-limit power generation amount P_MAX substantially becomes a half, which is equal to upper-limit power generation amount P_MAX1.

In response to the event that upper-limit power generation amount P_MAX is halved, load state control unit 84 controls the load state. Specifically, it controls on/off of switch circuits SW1-SW3 such that the commercial AC power is supplied preferentially to first load 201 having higher priority.

Once vehicle 120 is refueled, upper-limit power generation amount P_MAX doubles again to the sum of upper-limit power generation amounts P_MAX1 and P_MAX2.

At this time, in response to the increase of upper-limit power generation amount P_MAX, load state control unit 84 controls on/off of switch circuits SW1-SW3 such that the commercial AC power is supplied also to the electric load having lower priority.

It is noted that, even in the case where the power generation amount of the commercial power source is lower than upper-limit power generation amount P_MAX upon recovery of the commercial power source, load state control unit 84 controls the load state such that the load amounts of electric loads 201-203 would not exceed the power generation amount of the commercial power source, as described above. This enables automatic switching of the power source both upon power failure and recovery of the commercial power source.

Although it has been configured such that two vehicles 110, 120 are coupled to each other to use power supply apparatuses 50, 52 as the power source upon power failure of the commercial power source in the present embodiment, it is also possible to couple a greater number of vehicles.

Further, power supply apparatuses 50, 52 are not restricted to the power supply apparatuses mounted on hybrid vehicles. The similar effect can be obtained by applying the present invention to a secondary battery mounted on an electric vehicle. In the case where a secondary battery is used as the power supply apparatus of the present invention, the upper-limit power generation amount P_MAX is set based on the SOC (State of Charge) of the secondary battery. More specifically, an ECU of the electric vehicle provides a prescribed threshold value for the SOC of the secondary battery, and sets upper-limit power generation amount P_MAX such that the SOC does not become lower than the prescribed threshold value. The prescribed threshold value at this time is set to the SOC of the secondary battery required for the electric vehicle to run to the nearest charge station by itself.

As described above, according to the second embodiment of the present invention, even in the configuration where commercial AC power is to be supplied from a plurality of power supply apparatuses, it is possible to suppress drop of the commercial AC voltage by controlling the load state so as not to exceed a sum of the power amounts that can be supplied from the respective power supply apparatuses.

INDUSTRIAL APPLICABILITY

The present invention is applicable to an AC power supplying system supplying commercial AC power to an external electric load, a power supply apparatus generating commercial AC power, and a vehicle provided with the same.

The invention claimed is:

1. An AC power supplying system supplying AC power to a plurality of electric loads, comprising:
   a power supply apparatus outputting said AC power; and
   a control device controlling a load amount of each of said plurality of electric loads such that a supply amount of said AC power to said plurality of electric loads does not exceed an upper limit of a power amount which can be output from said power supply apparatus; wherein
   said power supply apparatus includes:
   a first motor generator coupled to an internal combustion engine of a vehicle and generating power;
   a first inverter connected to said first motor generator and receiving supply of power from a power source; and
   a control unit controlling an operation of said first inverter, said control unit including
   an upper limit setting unit setting an upper limit of a power amount generated by said first motor generator based on a remaining amount of fuel in said internal combustion engine,
   a power generation amount control unit controlling said power amount generated, based on said set upper limit of said power amount, and
   a transmitting unit transmitting a signal designating said upper limit of said power amount to said control device.

2. The AC power supplying system according to claim 1, wherein
   said control device includes:
   a receiving unit receiving a signal designating said upper limit of said power amount from said power supply apparatus;
   a load state detection unit detecting said load amount of each of said plurality of electric loads; and
   a load state control unit supplying said AC power only to a selected electric load from among said plurality of electric loads such that a sum of said detected load amounts of said electric loads does not exceed said upper limit of said power amount designated by said received signal.

3. The AC power supplying system according to claim 2, wherein said load state control unit selects said electric load to be supplied with said AC power, in accordance with priorities registered in advance.

4. The AC power supplying system according to claim 3, wherein said priorities are determined based on relative evaluation of importance of each of said plurality of electric loads.

5. The AC power supplying system according to claim 2, further comprising:
a commercial power source; and
a switching device for automatically connecting one of said commercial power source and said power supply apparatus to said plurality of electric loads.

6. The AC power supplying system according to claim 5, wherein said load state control unit compares a supply amount of said AC power from said commercial power source with said upper limit of said power amount at a timing when said switching device switches from connection between said power supply apparatus and said plurality of electric loads to connection between said commercial power source and said plurality of electric loads, and, when the supply amount from said commercial power source is smaller than said upper limit of said power amount, supplies said AC power only to a selected electric load from among said plurality of electric loads such that a sum of the load amounts of said plurality of electric loads does not exceed the supply amount from said commercial power source.

7. The AC power supplying system according to claim 1, wherein said upper limit setting unit sets said upper limit of said power amount to decrease along with a decrease of the remaining amount of the fuel in said internal combustion engine when said remaining amount of said fuel becomes not more than a prescribed reference value, and sets said upper limit of said power amount to zero when said remaining amount of said fuel reaches a predetermined threshold value that is lower than said prescribed reference value.

8. The AC power supplying system according to claim 1, wherein
said power supply apparatus further includes:
a second motor generator coupled to a driving wheel of a vehicle; and
a second inverter connected to said second motor generator and receiving supply of DC power from said power source; wherein
said control unit controls operations of said first and second inverters to drive said first and second motor generators and to generate AC power between neutral points of said first and second motor generators.

9. The AC power supplying system according to claim 8, wherein said upper limit setting unit sets said upper limit of the generated power amount such that the remaining amount of the fuel in said internal combustion engine is not less than a prescribed threshold value.

10. The AC power supplying system according to claim 9, wherein said prescribed threshold value corresponds to a remaining amount of the fuel in said internal combustion engine required for said vehicle to run to a supply station of said fuel.

11. The AC power supplying system according to claim 10, wherein said transmitting unit and said receiving unit have wireless communication media.

12. The AC power supplying system according to claim 10, wherein said transmitting unit and said receiving unit have power lines for supplying said AC power from said power supply apparatus to said plurality of electric loads as communication media.

13. A power supply apparatus supplying generated AC power to an external electric load, comprising:
a first motor generator coupled to an internal combustion engine of a vehicle and generating power;
a second motor generator coupled to a driving wheel of said vehicle;
first and second inverters connected to said first and second motor generators and receiving supply of DC power from a power source; and
a control device controlling operations of said first and second inverters to drive said first and second motor generators and to generate said AC power between neutral points of said first and second motor generators; wherein
said control device includes
an upper limit setting unit setting an upper limit of a power generation amount of said first motor generator based on a remaining amount of fuel in said internal combustion engine,
a power generation amount control unit controlling said power generation amount based on said set upper limit of said power generation amount, and
a transmitting unit transmitting a signal designating said upper limit of said power generation amount to said external electric load.

14. The power supply apparatus according to claim 13, wherein said upper limit setting unit sets said upper limit of said power generation amount such that the remaining amount of the fuel in said internal combustion engine is not less than a prescribed threshold value.

15. The power supply apparatus according to claim 14, wherein said prescribed threshold value corresponds to a remaining amount of the fuel in said internal combustion engine required for said vehicle to run to a supply station of said fuel.

16. A vehicle having the power supply apparatus as recited in claim 13.

* * * * *

UNITED STATES PATENT AND TRADEMARK OFFICE
CERTIFICATE OF CORRECTION

| | | |
|---|---|---|
| PATENT NO. | : 7,550,861 B2 | Page 1 of 1 |
| APPLICATION NO. | : 11/663214 | |
| DATED | : June 23, 2009 | |
| INVENTOR(S) | : Hichirosai Oyobe et al. | |

It is certified that error appears in the above-identified patent and that said Letters Patent is hereby corrected as shown below:

Title page, Item (73) Assignee: change "Tokyo (JP)" to --Toyota-shi (JP)--.

Signed and Sealed this

Third Day of August, 2010

David J. Kappos
*Director of the United States Patent and Trademark Office*